Feb. 28, 1967  A. A. M. L. CAMBOULIVES  3,306,542
DEVICES FOR CONNECTING DUCTS, IN PARTICULAR FOR ATTACHING
THE EJECTION DUCTS OF JET PROPULSION UNITS
Filed March 1, 1965  2 Sheets-Sheet 1
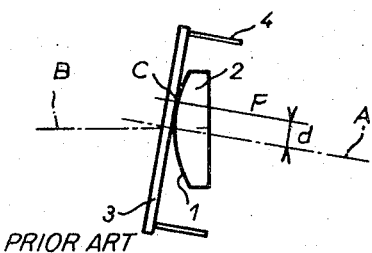
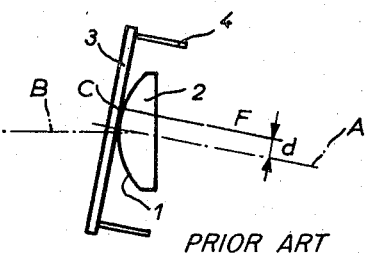
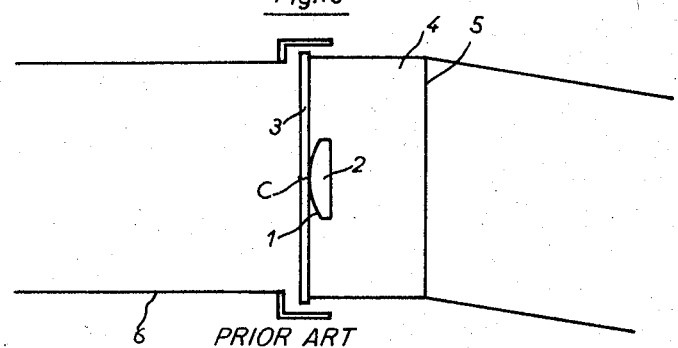
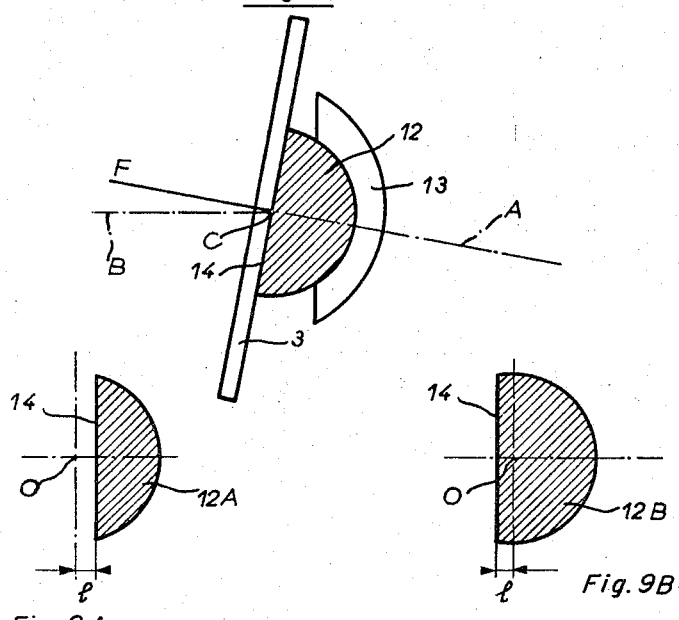
Inventor
Andre A. M. L. Camboulives
By Stevens Davis Miller & Mosher
Attorneys

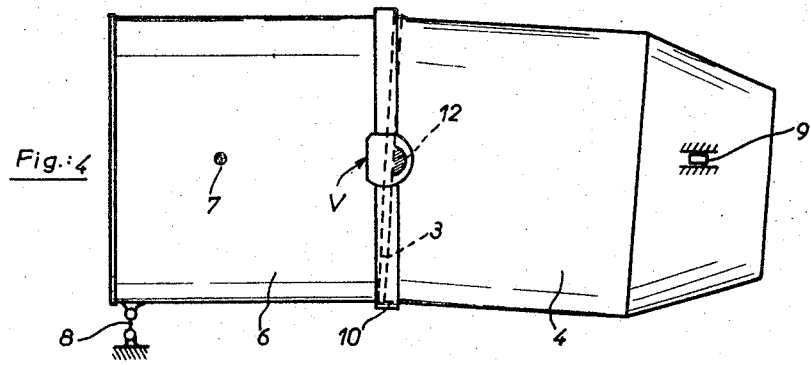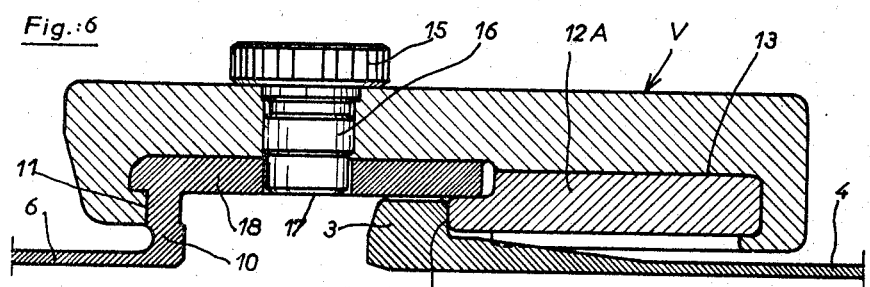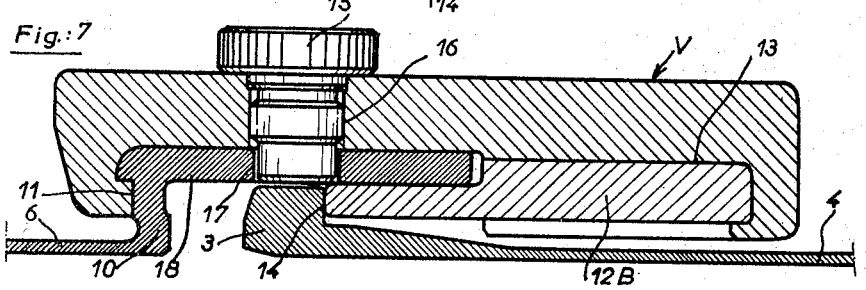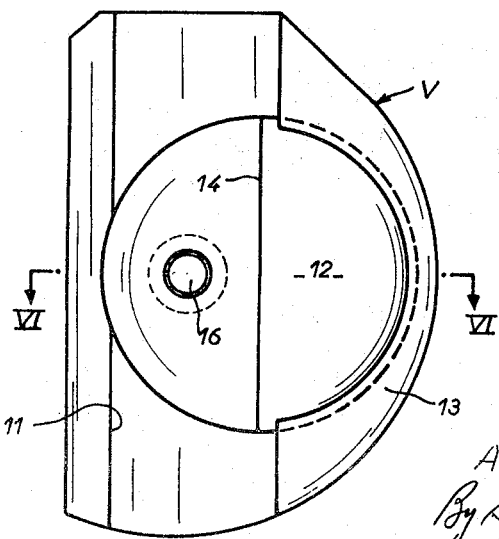

United States Patent Office 3,306,542
Patented Feb. 28, 1967

3,306,542
DEVICES FOR CONNECTING DUCTS, IN PARTICULAR FOR ATTACHING THE EJECTION DUCTS OF JET PROPULSION UNITS
André Alphonse Médéric Léon Camboulives, Billancourt, France, assignor to Societe Nationale d'Etude et de Construction de Moteurs d'Aviation, Paris, France, a company of France
Filed Mar. 1, 1965, Ser. No. 435,855
Claims priority, application France, Mar. 5, 1964, 966,285
7 Claims. (Cl. 239—265.35)

The fitting of a jet engine in an aircraft wing unit sometimes requires that the connection between the engine and the ejection duct shall be articulated. In some cases, the engine proper is fixed on the aircraft wing unit, independently of the ejection duct, by means of an isostatic suspension which permits, without any difficulty, the deformations inherent in the working of the engine and in the flight of the aircraft. The ejection or after-burning duct is suspended on the wing unit at the rear and is coupled at its front end to the rear end of the engine by a semi-flexible articulation, generally by means of a device comprising connectors or trunnions. The suspension of the duct may thus be likewise isostatic and the relative movements of the duct suspension with respect to the engine suspension are performed without any damage.

The device used for coupling the ejection duct to the engine must be capable of allowing for:

The possibility of inclination of the axis of the duct with respect to that of the engine;

The possibility of rotation of the duct itself, around its own axis;

The force generated by the pressure prevailing inside the duct;

The inertial force on the duct upon acceleration of the aircraft.

In a construction adopted at the present time, the device used enables the ejection duct to be coupled to the engine by means of two simple connectors which are diametrically opposite one another and are fixed to the rear flange of the engine. It is immaterial whether these two connectors are located in a vertical or a horizontal diametral plane.

When the duct oscillates about the diameter in this plane, the upstream flange of the duct pivots and slides on the convex upstream faces of the two stationary connectors.

The device in question has certain drawbacks which will now be described with reference to FIGURES 1, 2 and 3 of the accompanying drawings.

(a) The upstream face 1 of the connector member 2 on which the upstream flange 3 of the ejection duct 4 bears is convex so as to permit correct rotation of the duct. When the inclination of the axis A of the ejection duct varies with respect to the axis B of the engine, the bearing point C of the ejection duct is displaced relatively to the member 2 (FIGURE 1). This displacement produces a supplementary couple F.d due to the shift in the point of application of the force F, which couple increases the stress on the suspension of the engine and of the duct. This couple increases as the radius of curvature of the bearing face 1 of the member 2 increases. If this radius of curvature is reduced, the leverage distance d of the couple is reduced (see FIGURE 2), but the specific pressures on the bearing face 1 of the member 2 and on the upstream flange 3 of the duct 4 increase.

(b) If the construction is such that the ejection duct is inclined with respect to the engine, it is necessary to provide, in the duct, a discontinuity 5 (see FIGURE 3) so as to enable the upstream flange 3 of the duct 4 to be kept coaxial with the axis of the engine 6, so that, in the normal position of the duct, there shall not be any parasitic couple due to the displacement of the bearing point C relatively to the member 2 when the duct 4 inclines.

The present invention has as one object thereof, to eliminate these drawbacks, while nevertheless resorting only to a relatively simple modification of the construction of the device commonly employed at present.

According to the present invention, the or each connector is provided with a shoe or other abutment member mounted in such manner as to be pivotable within the connector and having a face of relatively large size in contact with the flange of the ejection duct, the arrangement being such that the point of application of pressure to the said contact face remains substantially on the axis of the ejection duct, whatever the relative movements of the latter.

The following description with reference to the accompanying drawings, given by way of non-limitative example only, will make it clearly understood how the invention can be carried into effect.

In the drawings:

FIGURES 1, 2 and 3 are, as already referred to, diagrams explaining the drawbacks attaching to known devices, which the present invention makes it possible to eliminate;

FIGURE 4 is a diagrammatic view of the terminal portion of a jet propulsion unit equipped with an improved attachment device according to the invention;

FIGURE 5 is a bottom view of one embodiment of such a device, drawn to a larger scale;

FIGURE 6 is a longitudinal section on the line VI—VI of FIGURE 5, drawn to a still larger scale, the attachment device being shown in position on the propulsion unit;

FIGURE 7 is a similar section of a modified device used in association with the device shown in FIGURE 6 and FIGURES 8 and 9A–9B are diagrams explaining the invention.

Referring to FIGURE 4, there is shown the terminal portion of a jet propulsion unit, the engine 6 of which is suspended from the aircraft wing unit in the usual manner at 7 and 8, while the ejection duct 4 has a suspension 9 comprising sliding rollers, the suspension 9 being independent of the engine suspension and enabling the ejection duct to turn about its axis. Attachment of the ejection duct 4 to the engine 6 is effected, in a manner analogous to what has been customary heretofore, by means of a pair of diametrically opposite connectors V connecting the upstream flange 3 of the ejection duct 4 to the downstream flange 10 of the engine 6, the connectors straddling or embracing the two flanges.

Although the front edge 11 of the connector V (see FIGURES 5, 6 and 7) bears directly against the downstream flange 10 of the engine, as in the known arrangement, the position is not the same on the side where the upstream flange 3 of the ejection duct is located. Whereas in the known arrangement, the rear edge of the connector bears directly against the upstream flange of the duct, with the connector V of the invention the upstream flange is in engagement with an abutment element or shoe 12 of semi-circular form which can pivot or oscillate about its center in a recess 13, which is likewise semi-circular, is concentric with the shoe 12 and is formed in the rear portion of the connector V. The shoe 12 has a plane face 14 which is directed forwardly and against which the upstream flange 3 of the ejection duct 4 abuts.

The assembly V with its oscillating shoe 12 is fixed in the usual manner on the downstream flange 10 of the engine 6 by means of a screw 15 extending through an aperture 16 formed in the body of the assembly and screwing into a seat 17 formed in an extension 18 of the flange 10.

The operation of the assembly equipped with an oscillating shoe is easy to understand by referring to the diagram shown in FIGURE 8 and it will be seen clearly therein how the drawbacks to which attention was drawn above in connection with the known device are removed.

(a) Since the center of curvature of the oscillating shoe 12 is located at the intersection of the axis B of the engine and the axis A of the duct, when the latter inclines there is no longer any displacement of the bearing point C of the duct relatively to the connector. This arrangement therefore avoids the occurrence of supplementary couples and, consequently, of supplementary stresses in the suspension of the engine and of the duct. The point of application of the applied force F always remains at the center C of the connector, so that the latter is well balanced. Moreover, it is not necessary for the contact surface 14 of the shoe, against which the flange 3 of the duct bears, to be convex; this surface may be plane and the specific pressures on the shoe and on the flange of the duct are thereby substantially reduced. However, slight curvature of the contact surface 14 may permit better fitting together of the upstream flange of the duct and the shoe, so as to take account of the deformation of the flange by reason of the stresses applied.

(b) The device according to the invention may be constructed to be of universal application; it can be used to mount a given jet engine on any aircraft without any modification either of the engine or of the ejection duct. The shoe adapts itself of its own accord to the angle of inclination called for. It thus does away with the discontinuity in the duct (see 5 in FIGURE 3).

By virtue of its construction, the device of the present invention enables the axis of the duct to be inclined with respect to the engine in the plane of the two connectors. For this purpose it is sufficient for the two diametrically opposite (left-hand and right-hand) shoes to be of different sizes, as shown at 12A and 12B in FIGS. 9A and 9B. With one of the shoes, the shoe 12A, the extent of the curved surface will be less than a semicircle, its plane abutment face 14 being set back by a distance $l$ with respect to the center O which is located on the diameter at the ends of which the connectors are located; the curved surface of the other shoe 12B, on the other hand, will extend over more than a semi-circle, its plane abutment face 14 being offset on the opposite side of the center O by the same distance $l$. These two dissimilar shoes 12A and 12B are shown in FIGURES 6 and 7 respectively, mounted in their respective seats 13 in the connectors V.

It will therefore be seen that the device according to the present invention enables the kinematic displacement due to the inclination of the duct with respect to the engine to be ensured under the best conditions, that it reduces the weight of the jet engine and that it avoids introducing supplementary stresses in any aircraft to be equipped with it, without any modification either of the downstream flange of the connection, or of the upstream flange of the duct, or of the connector.

In the above description, reference has been made throughout to the connection of the engine of a jet propulsion unit to its ejection duct. Although this is the application of the invention which appears to be of greatest interest, it will be obvious that it is not the only application and that the device of the invention, comprising a shoe pivotally mounted in a connector, will permit the connection of ducts and other tubular bodies generally.

What is claimed is:

1. In combination with a jet pipe having an outer integral flange protruding generally transversely with respect to the longitudinal axis of said pipe, a jet pipe attachment device comprising a stationary housing, and a shoe accommodated in said housing for substantially free pivotal motion with respect thereto about an axis substantially perpendicular to said longitudinal axis, but refrained from free relative longitudinal displacement, said shoe having a bearing face engaging said flange, the mutual arrangement of said bearing face and said flange being such that the center of pressure of contact therebetween remains in a plane through said longitudinal axis irrespective of relative angular displacements of said jet pipe.

2. A jet pipe attachment device as claimed in claim 1, wherein said stationary housing has an inner guiding surface of part circular shape, and said shoe has an outer guided surface of part circular shape engaging said inner guiding surface and being concentric therewith, whereby the pivoting axis of said shoe with respect to said stationary housing passes through the center of said circular surfaces.

3. A jet pipe attachment device as claimed in claim 2, wherein said center of pressure is adjacent said pivoting axis.

4. A jet pipe attachment device as claimed in claim 1, wherein said bearing surface is substantially planar with a slight amount of curvature.

5. In combination with a jet pipe having an outwardly protruding annular flange integral therewith and extending in a plane substantially perpendicular to the longitudinal axis of said pipe, a jet pipe attachment device comprising two diametrically opposite stationary housings, and a shoe accommodated in each of said housings for substantially free pivotal motion with respect thereto about an axis substantially perpendicular to said longitudinal axis, but refrained from free relative longitudinal displacement, each shoe having a bearing face engaging said flange, the mutual arrangement of said bearing face and said flange being such that the center of pressure of contact therebetween remains in a plane through said longitudinal axis, irrespective of relative angular displacements of said jet pipe.

6. A jet pipe attachment device as claimed in claim 5, wherein said two housings are alike whereas said shoes are of different designs, the bearing face of one of said shoes being offset forwardly and that of the other of said shoes being offset rearwardly with respect to a diameter of said pipe.

7. A jet pipe attachment device as claimed in claim 6, wherein the distances by which the bearing faces of the irrespective shoes are offset are equal.

References Cited by the Examiner

UNITED STATES PATENTS 3,157,028  11/1964  Gaubotz _____ 239—265.35

EVERETT W. KIRBY, *Primary Examiner.*